C. STEENSTRUP.
PACKING AND THE LIKE.
APPLICATION FILED FEB. 1, 1918.
1,279,474.
Patented Sept. 17, 1918.
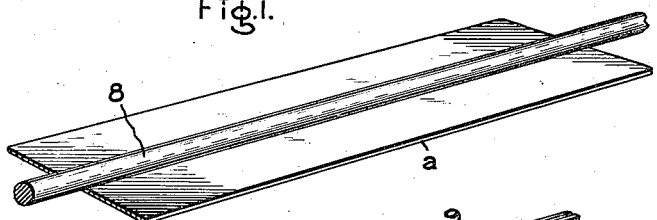
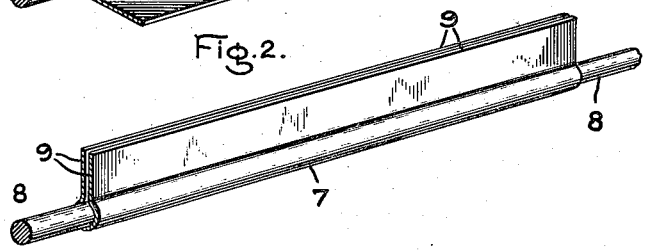
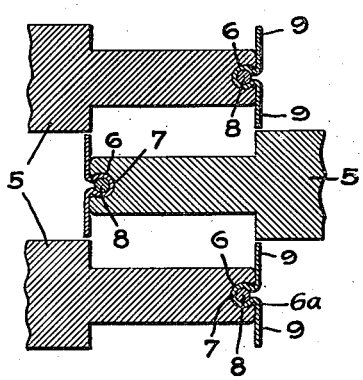
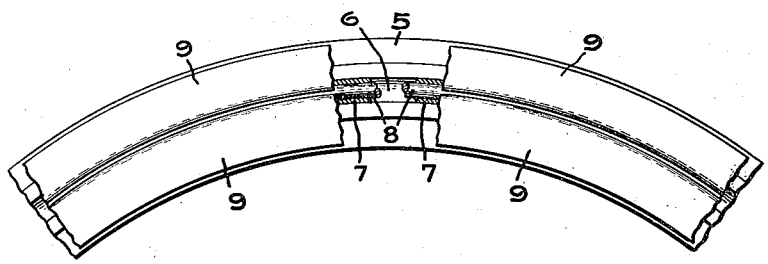
Inventor:
Christian Steenstrup,
by Albert G. Davis
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

PACKING AND THE LIKE.

1,279,474.  Specification of Letters Patent.  Patented Sept. 17, 1918.

Application filed February 1, 1918. Serial No. 214,911.

*To all whom it may concern:*

Be it known that I, CHRISTIAN STEENSTRUP, a citizen of the United States, residing at Schenectady, in the county of Schenectady, State of New York, have invented certain new and useful Improvements in Packings and the like, of which the following is a specification.

This invention relates to packings such as are used to prevent leakage of fluid between two relatively moving parts. Such packings are employed for example in connection with rotating shafts to prevent leakage between a shaft and an adjacent stationary wall through which it passes, one well-known application of this character being found in connection with the packings of elastic fluid turbines. Such packings may also be employed to prevent leakage between a stationary wall and an adjacent rotor.

In the formation of certain types of packings, a packing member is utilized comprising a curved or annular carrier having a groove in its edge in which the central portion of a length of thin material is held or embedded by means of a wire or calking strip, the two outer portions of the length of thin material projecting beyond the sides of the carrier to provide thin packing edges. Heretofore in the manufacture of such packing members considerable difficulty has been experienced due to the outer portions of the thin material buckling or distorting while being brought into the desired positions, and one object of my invention is to provide an improved method of manufacturing such packing members whereby this difficulty is overcome and the packing elements are more easily and expeditiously made.

A further object of my invention is to provide an improved element for use in manufacturing packing members of the type referred to.

For a consideration of what I believe to be novel and my invention, attention is directed to the accompanying specification and the claims appended thereto.

In the drawing, Figures 1 and 2 illustrate the first two steps of my improved method; Fig. 3 is a section through several packing members made in accordance with my method, and Fig. 4 is a side elevation, partly broken away, of a portion of a packing member as shown in Fig. 3.

Referring to the drawing, 5 indicates curved or ring-shaped carriers each provided with a groove 6 in one edge into which the central portion of a thin strip is to be embedded by means of wires or calking strips. Figs. 3 and 4 illustrate completed packing members, and it will be seen that a length of material has its central portion 7 embedded or fastened in a groove 6 by a wire or calking strip 8, and that the two outer portions 9 of the length of material project beyond the sides of the member 5 to provide a thin packing edge. In Fig. 3, for example the upper and lower rings, 5, may be stationary, being carried by a fixed wall and the intermediate ring, 5, may be a rotating ring carried by an adjacent rotating member the packing being utilized to prevent leakage between the wall and the member.

Now, according to my improved method, I first form a packing element by taking a length of thin flat material, as indicated at *a* in Fig. 1, placing at its central portion the wire or calking strip 8, and then bending the sides of the length of material up about the wire or calking strip 8, as shown in Fig. 2, bringing them quite around it so that the two portions 9 are substantially parallel to each other and almost or entirely in contact with each other. In this manner the packing material is caused to grip the calking strip so as to form in effect a single unit which can be conveniently handled. The wire or calking strip 8 with the length of material *a* about it is then bent into a curved shape and inserted into a groove 6. The material at the edges of the groove 6 is then preferably rolled in a little as shown at 6ª in Fig. 3 to firmly grip and hold the packing element in the groove, after which the two outer portions 9 of the length of material are bent through an angle of 90° to the positions shown in Figs. 3 and 4.

Any desired length of the packing element, as shown in Fig. 2, may be formed, and if found desirable it may be rolled on spools from which it is afterward used. The packing carriers are usually in the form of complete rings so that the grooves 6 are annular and the packing element, as shown in Fig. 2, may be fed into a groove 6 by starting one end in and then curving the element and tapping it in until the starting point is reached. The length of packing element in the groove is then cut off at such a point that the two ends abut. The bending of the two outer portions 9 from the positions shown in Fig. 2 to their final positions, as shown in Figs. 3 and 4, may be done with any suitable tools, and if the material of the strip $a$ is comparatively thick, the bending may be performed in several operations in a manner analogous to spinning.

By first forming a packing element as shown in Fig. 2, I find that I am able to curve it around to fit it into an annular groove of even small diameter without trouble due to the side portions 9 distorting or buckling since because the side portions are so close together there is but little difference in the diameters of the two circles or rings which they form. I also find that a packing element as shown in Fig. 2 can be very conveniently and expeditiously handled so that my improved method can be carried out rapidly and cheaply, and without complicated tools.

In accordance with the provisions of the patent statutes, I have described what I now consider to be the best embodiment of my invention, but I desire to have it understood that this is only by way of illustration and that the invention can be carried out in other ways such as come within the scope of the appended claims.

What I claim as new and desire to secure by Letters Patent of the United States, is:—

1. The method of forming a packing member comprising a carrier having a curved groove in its edge in which the central portion of a length of thin material is held by a calking strip, the outer portions of such length of material projecting beyond the sides of the carrier to provide thin packing edges, which comprises bending a length of material well up around a calking strip so that the two outer portions of the length of material are substantially parallel and quite close together, inserting the central portion of the material and the calking strip into the groove, and bending the outer portions of the length of material down at right angles to the central portion so that they project beyond the sides of the carrier.

2. The method of forming a packing member comprising a carrier having an annular groove in its edge in which the central portion of a length of thin material is held by a calking strip, the outer portions of such length of material projecting beyond the sides of the carrier to provide thin packing edges, which comprises taking a length of flat thin material, placing a calking strip along its longitudinal center, bending the length of thin flat material well up around the calking strip so that the two outer portions of it are substantially parallel and quite close together, inserting the central portions of the material and the calking strip into the groove, and bending the outer portions of the strip down at right angles to the central portion so that they project beyond the sides of the carrier.

3. The method of forming a packing member comprising a carrier having an annular groove in its edge in which the central portion of a length of thin material is held by a calking strip, the outer portions of such length of material projecting beyond the sides of the carrier to provide thin packing edges, which comprises taking a packing element comprising a length of thin material bent well up around a calking strip so that the strip is substantially entirely surrounded by the material, feeding said element into an annular groove in a carrier, and flattening out the two outer portions of the material so that they project beyond the sides of the carrier.

4. A packing element for use in manufacturing packings comprising a continuous length of thin material bent well up around a calking strip so that the outer portions of the material are close together and substantially parallel.

In witness whereof, I have hereunto set my hand this 30th day of January 1918.

CHRISTIAN STEENSTRUP.